United States Patent
Dingus

(10) Patent No.: US 10,246,008 B2
(45) Date of Patent: Apr. 2, 2019

(54) VARIABLE ACCELERATOR LIGHT ASSEMBLY

(71) Applicant: Samuel Dingus, Florence, KY (US)

(72) Inventor: Samuel Dingus, Florence, KY (US)

( * ) Notice: Subject to any disclaimer, the term of this patent is extended or adjusted under 35 U.S.C. 154(b) by 0 days.

(21) Appl. No.: 15/812,658

(22) Filed: Nov. 14, 2017

(65) Prior Publication Data

US 2018/0134210 A1    May 17, 2018

Related U.S. Application Data

(60) Provisional application No. 62/421,701, filed on Nov. 14, 2016.

(51) Int. Cl.
*B60Q 1/26* (2006.01)
*B60Q 1/44* (2006.01)

(52) U.S. Cl.
CPC ............ *B60Q 1/445* (2013.01); *B60Q 1/441* (2013.01); *B60Q 1/444* (2013.01); *B60Q 1/447* (2013.01)

(58) Field of Classification Search
CPC ................................. B60Q 1/44; B60Q 1/444
USPC ............................ 340/463, 467, 479; 701/70
See application file for complete search history.

(56) References Cited

U.S. PATENT DOCUMENTS

| | | | |
|---|---|---|---|
| 4,149,141 A * | 4/1979 | Tanimura | B60Q 1/444 340/464 |
| 4,320,384 A | 3/1982 | Carlson | |
| 4,683,996 A * | 8/1987 | Hattori | B60W 10/02 477/74 |
| 5,089,805 A * | 2/1992 | Salsman | B60Q 1/447 340/467 |
| 5,150,098 A * | 9/1992 | Rakow | B60Q 1/444 340/464 |
| 5,594,416 A * | 1/1997 | Gerhaher | B60Q 1/302 307/10.8 |
| 5,805,060 A | 9/1998 | Schroeder | |
| 5,856,793 A * | 1/1999 | Tonkin | B60Q 1/444 340/467 |
| 5,878,359 A * | 3/1999 | Takeda | F02D 11/106 701/107 |
| 5,921,641 A * | 7/1999 | Lupges | B60T 7/042 180/271 |
| 6,133,852 A * | 10/2000 | Tonkin | B60Q 1/444 340/464 |
| 6,268,792 B1 | 7/2001 | Newton | |
| 6,573,830 B2 | 6/2003 | Cohen et al. | |
| 6,753,769 B1 | 6/2004 | Elliott | |
| 7,075,423 B2 * | 7/2006 | Currie | B60Q 1/444 340/467 |
| 7,893,823 B2 * | 2/2011 | Morales | B60Q 1/444 340/479 |

(Continued)

*Primary Examiner* — Tai T Nguyen
(74) *Attorney, Agent, or Firm* — Global Intellectual Property Agency, LLC; Daniel Boudwin

(57) ABSTRACT

A variable accelerator light assembly. The variable accelerator light assembly includes a light bar having light elements spanning between a first end and an opposing second end. A sensor connected to a vehicle accelerator pedal of a vehicle detects how much a user depresses the vehicle accelerator pedal, and transmits this information to the light bar. The light elements energize sequentially from a middle portion outward to the opposing first and second end. The progressive actuation of the vehicle accelerator pedal causes an increasing number of the light elements to energize in the sequential configuration.

11 Claims, 4 Drawing Sheets

(56) References Cited

U.S. PATENT DOCUMENTS

| | | | | |
|---|---|---|---|---|
| 2005/0146443 A1* | 7/2005 | Chen | ................ | B60Q 1/444 340/467 |
| 2008/0136616 A1* | 6/2008 | Pancoast | ................ | B60Q 1/44 340/458 |
| 2015/0158418 A1* | 6/2015 | Bingle | ................ | B60Q 1/444 340/479 |

* cited by examiner

VARIABLE ACCELERATOR LIGHT ASSEMBLY

CROSS REFERENCE TO RELATED APPLICATION

This application claims the benefit of U.S. Provisional Application No. 62/421,701 filed on Nov. 14, 2016. The above identified patent application is herein incorporated by reference in its entirety to provide continuity of disclosure.

BACKGROUND OF THE INVENTION

Field of the Invention

The present invention relates to a variable accelerator light assembly. More specifically, the present invention provides a variable accelerator light assembly that actuates a plurality of lights in response to the operation an acceleration pedal.

Devices have been disclosed in the known art that relate to light assemblies. These include devices that have been patented and published in patent application publications. These devices in the known art have several known drawbacks. For example, the light assemblies fail to provide a light bar that sequentially energize therealong, from a middle portion to a pair of opposing lateral portions.

In light of the devices disclosed in the known art, it is submitted that the present invention substantially diverges in design elements from the devices in the known art and consequently it is clear that there is a need in the art for an improvement to existing light assembly devices. In this regard, the instant invention substantially fulfills these needs.

SUMMARY OF THE INVENTION

In view of the foregoing disadvantages inherent in the known types of vehicle light systems now present in the art, the present invention provides a new variable accelerator light assembly wherein the same can be utilized for providing convenience for the user when accelerating a vehicle and indicating the relative rate of acceleration.

It is therefore an object of the present invention to provide a new and improved variable accelerator light assembly that energizes a plurality of lights of a light bar in response to actuation of a vehicle accelerator pedal.

It is another object of the present invention to provide a variable accelerator light assembly wherein the plurality of lights of a light bar that energizes in a sequential configuration.

Another object of the present invention is to provide a variable accelerator light assembly that energizes a plurality of light elements beginning from a medial portion and extending laterally to both a first end and a second end of the light bar.

Another object of the present invention is to provide a variable accelerator light assembly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
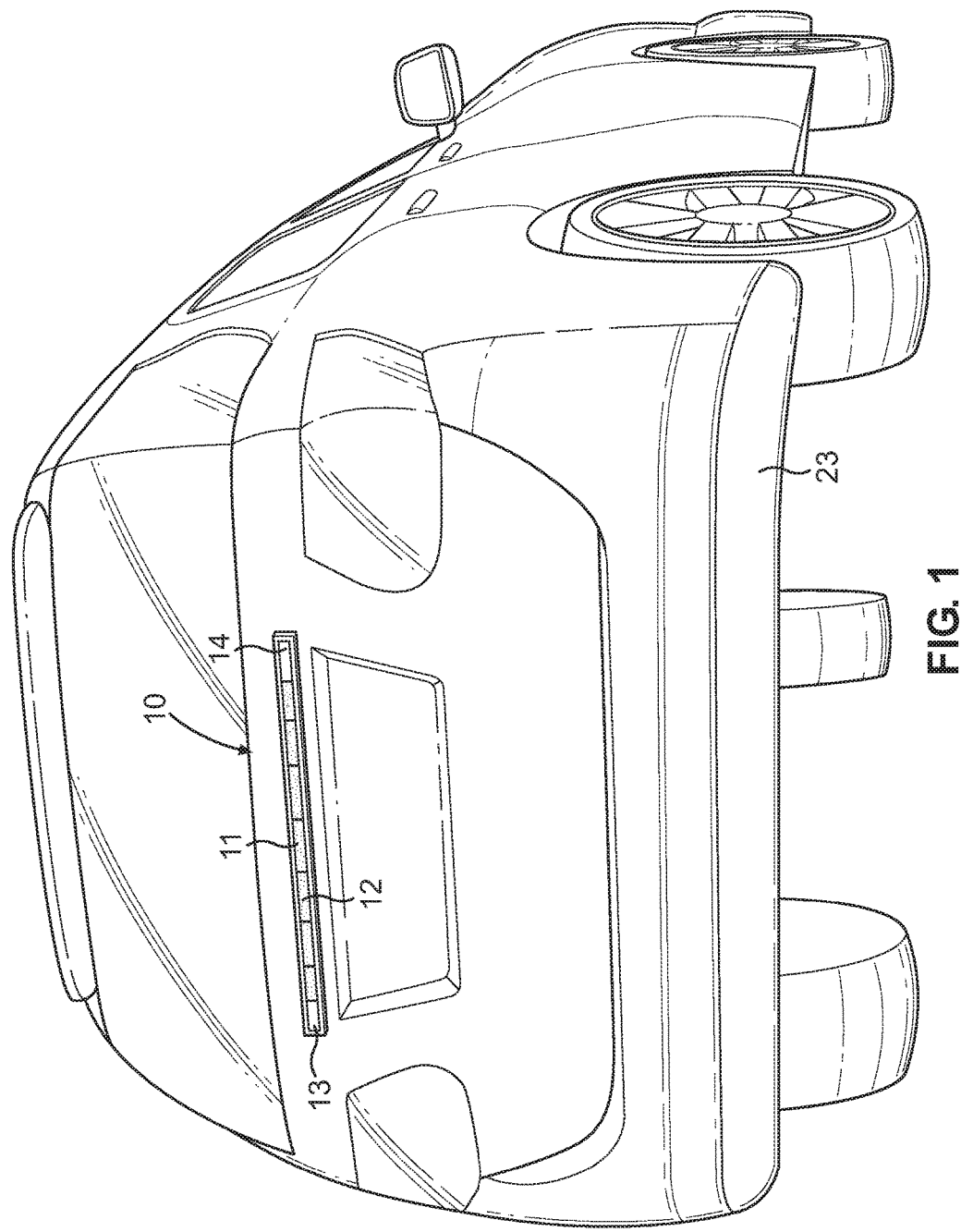
FIG. 1 shows a perspective view of the variable accelerator light assembly disposed at a rear of a vehicle.

Reference is made herein to the attached drawings. Like reference numerals are used throughout the drawings to depict like or similar elements of the variable accelerator light assembly. For the purposes of presenting a brief and clear description of the present invention, the preferred embodiment will be discussed as used for indicating the acceleration of a vehicle by detecting the amount of actuation of the acceleration pedal and energizing a corresponding group of lights on a rear of the vehicle. The figures are intended for representative purposes only and should not be considered to be limiting in any respect.

Referring to FIG. 1, there is shown a perspective view of the variable accelerator light assembly affixed to a rear of a vehicle. The variable accelerator light assembly 10 provides a light bar 11 that is mountable, or otherwise disposed, to a vehicle 23 that is used to indicate a relative rate of acceleration of the vehicle 23. The light bar 11 includes a plurality of light elements 12 arranged in a single row and disposed between a first end 13 and an opposing second end 14. In the shown embodiment, the light bar 11 is partially energized to indicate some actuation of the vehicle's acceleration pedal.

The variable accelerator light assembly 10 indicates the relative rate of acceleration of the vehicle by energizing the plurality of light elements 12. A sensor (shown in FIGS. 2 and 3) is configured to determine an amount of actuation of the vehicle accelerator pedal. The amount of actuation of a vehicle accelerator pedal causes the plurality of light elements 12 to energize, corresponding to the amount of actuation detected. In this way, a vehicle trailing, or otherwise positioned behind the vehicle 23, may readily determine the rate of acceleration of the vehicle 23 by observing the energized light elements 12 of the variable accelerator light assembly 10. The greater the number of energized light elements 12, the greater the amount of actuation of the vehicle accelerator pedal being detected by the sensor.

In the shown embodiment, the light bar 11 is disposed centrally on an exterior rear surface of the vehicle 23, and extends horizontally thereon. Further, the light bar 11 has almost all of the light elements 12 energized indicating that the vehicle 23 is accelerating at a high rate.

Figure 2:
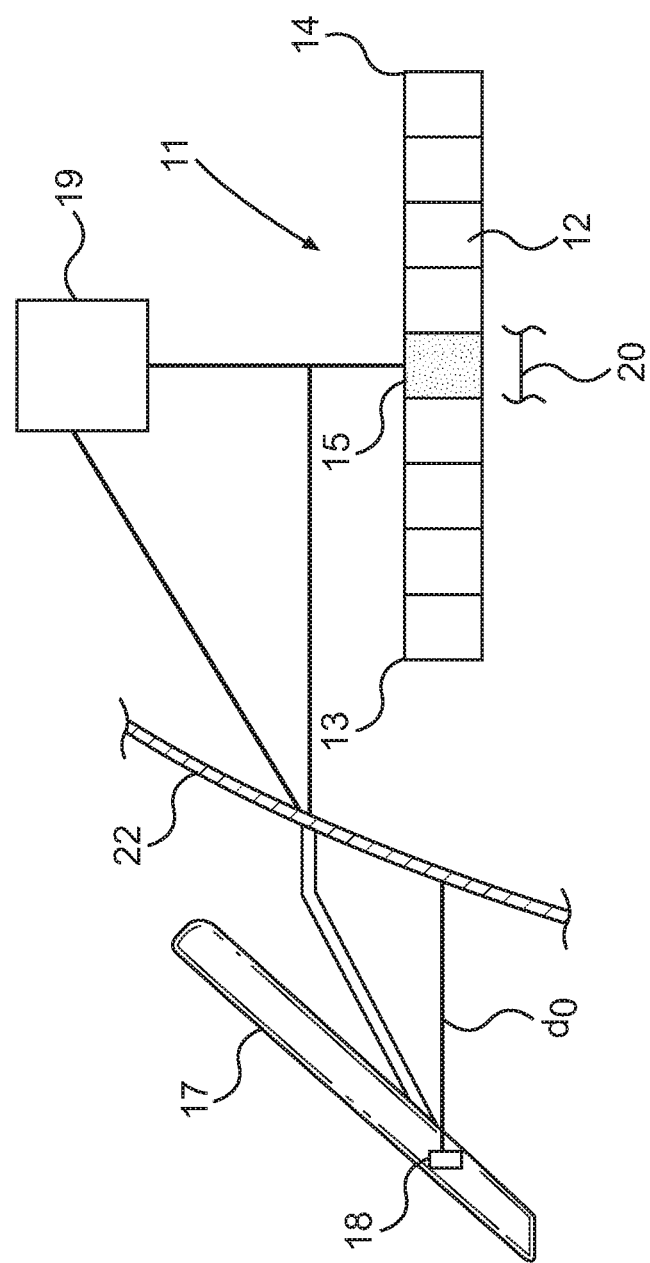
FIG. 2 shows a perspective view of the variable accelerator light assembly with the accelerator pedal in a first position.
Figure 3:
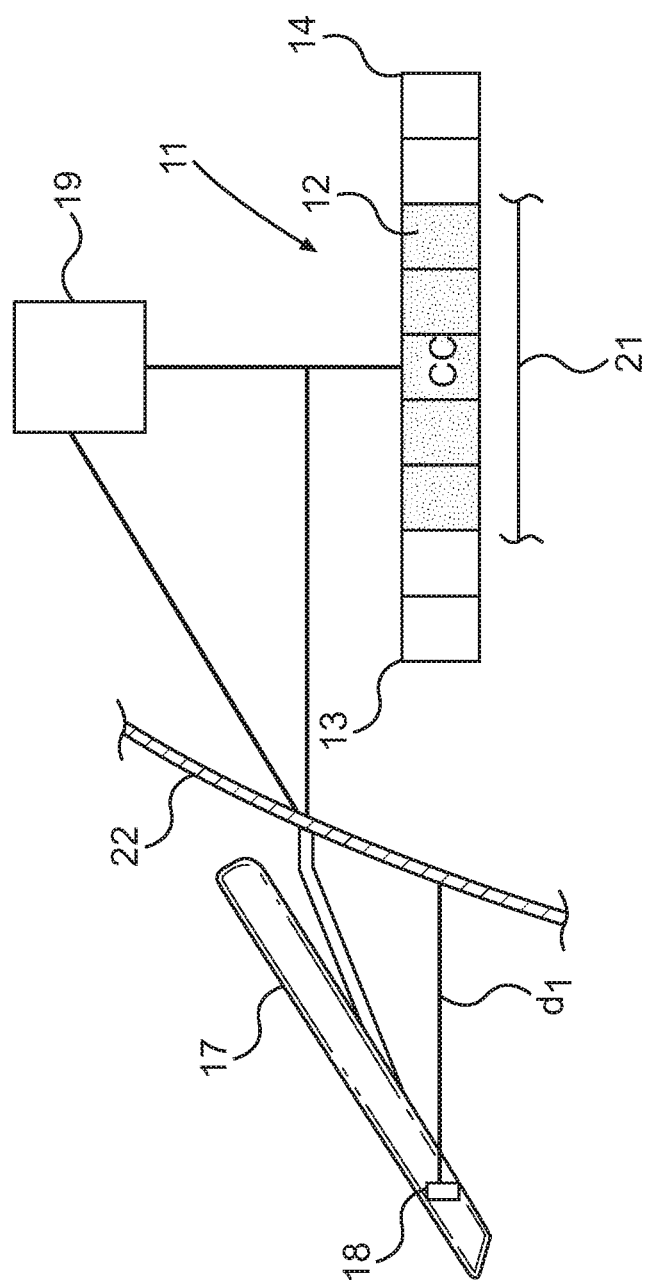
FIG. 3 shows a perspective view of the variable accelerator light assembly with the accelerator pedal in a second position.

Referring to FIGS. 2 and 3, there is shown a perspective view of the variable accelerator light assembly with the accelerator pedal in a first position and in a second position, respectively. The plurality of light elements 12 are configured to energize in a sequential configuration, wherein the sequential configuration begins from a medial portion and extends laterally to both the first end 13 and the second end 14, respectively. The progressive actuation of the vehicle accelerator pedal 17 causes an increasing number of the plurality of light elements to energize in the sequential configuration.

A middle light element 15 of the light bar 11, as shown in FIG. 2, is disposed at the medial portion. In one embodiment, the light bar 11 includes indicia thereon indicative of the activation or deactivation of the vehicle's cruise control. For example, in one embodiment, one of the plurality of light elements 12 include the indicia "CC", such that when the vehicle's cruise control is activated, the indicia "CC" is energized. The indicia "CC" may be positioned in lieu of the middle light element 15 or in addition thereof.

In the shown views, the accelerator pedal 17 is operably connected to the light bar 11 and a power source 19. The accelerator pedal 17 is configured to be actuated and cause an increase in vehicle engine activity, thereby causing the vehicle to accelerate in ideal conditions.

In the shown embodiments, the power source 19 includes a battery, independent of the vehicle's battery, that is in electrical communication with the light bar 11 and the sensor 18. In alternative embodiments, the power source 19 is the vehicle's battery. As shown, the sensor 18 is disposed on the accelerator pedal 17. However, the sensor 18 may be disposed at any point in the vehicle, or operably connected to an acceleration system of the vehicle. In one embodiment, the sensor 18 is an infrared sensor that detects the distance between the sensor 18 and the vehicle wall. In an alternative embodiment, the sensor 18 is a potentiostat. In yet another alternative embodiment, the sensor 18 is a Hall-Effect sensor.

Specifically referring to FIG. 2, the accelerator pedal 17 is in a first or initial position, at a distance do, as detected by the sensor 18. In this initial position, the middle light element 15 of the plurality of lights 12 is energized. In the shown embodiment, the middle light element 15 remains energized regardless of the position of the accelerator pedal 17. In this way, the middle light element 15 comprises the group of energized lights 20 that indicates that the system is functioning properly.

Specifically referring to FIG. 3, the accelerator pedal 17 is now in a second position, at a distance di, as detected by the sensor 18. In this second position, the accelerator pedal 17 is actuated, relative to the the accelerator pedal 17 of FIG. 2, although not completely depressed. The group of energized lights 21 indicate the actuation of the accelerator pedal 17, and by relation, the rate of acceleration of the vehicle. Further, the group of energized lights 21 demonstrates the sequential energization of the light elements.

Figure 4:
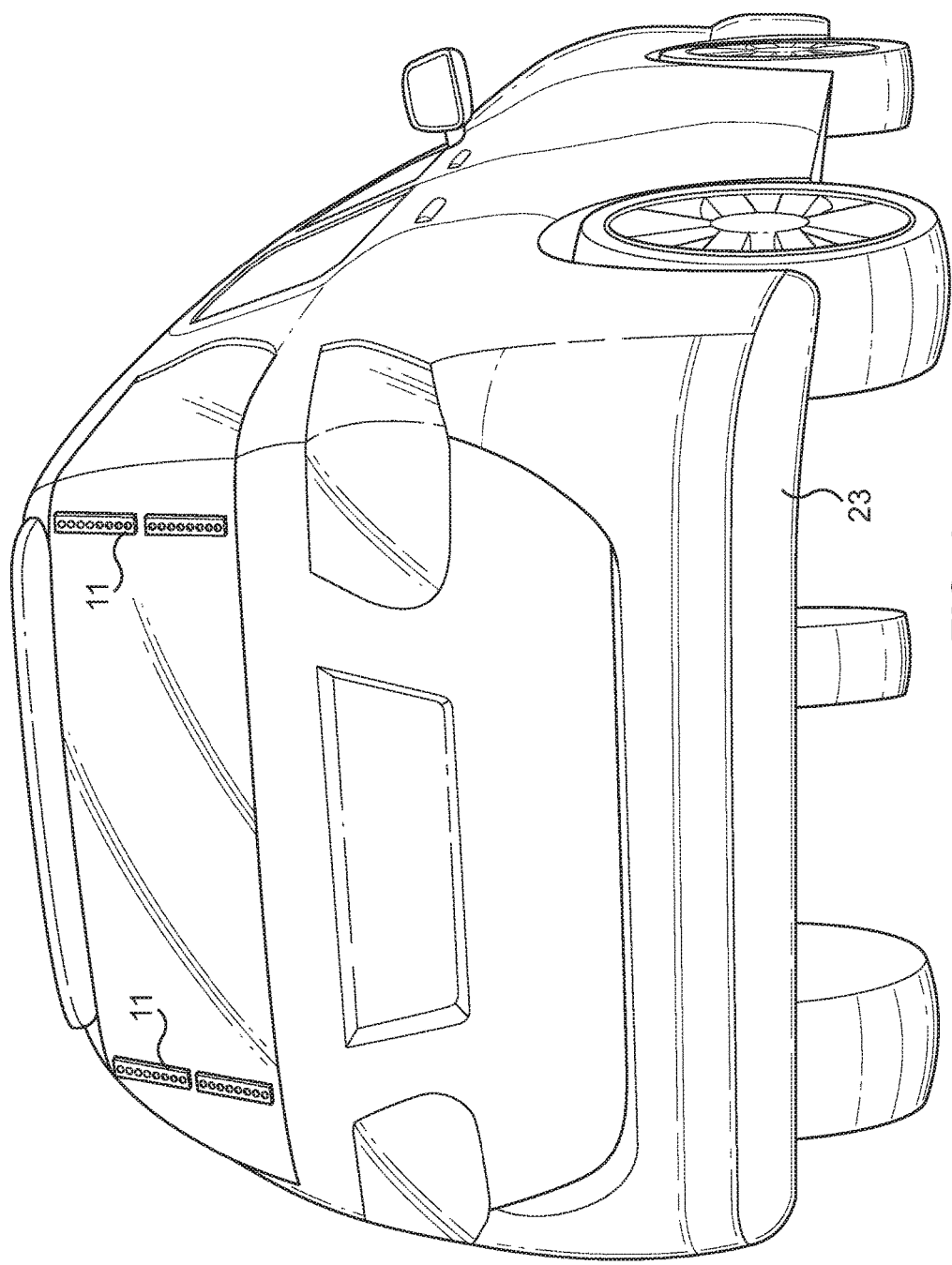
FIG. 4 shows a perspective view of another embodiment of the variable accelerator light assembly disposed at a rear of a vehicle.

Referring to FIG. 4, there is shown a perspective view of another embodiment of the variable accelerator light assembly disposed at a rear of a vehicle. In this embodiment, a pair of light bars 11 are disposed vertically on opposing sides of the vehicle 23. The light elements of the light bars 11 energize in an equivalent manner as the light elements as shown in FIGS. 2 and 3. As such, the variable accelerator light assembly provides multiple points of indication to onlookers and observers. In one embodiment, the color of the energized light bars 11 changes from a first color to a different second color upon a triggering event. For example, the triggering event may include activation of the vehicle's cruise control, reaching a certain amount of actuation of the accelerator pedal, and the like.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A variable acceleration light assembly, comprising:
a light bar including a plurality of light elements disposed between a first end and an opposing second end;
a sensor configured to determine an amount of actuation of a vehicle accelerator pedal;
the plurality of light elements configured to energize in a sequential configuration, the sequential configuration beginning from a medial portion and extending laterally to both the first end and the second end respectively;
wherein a single light element of the plurality of light elements disposed at the medial portion is the only light element of the plurality of light elements that is energized when the vehicle accelerator pedal is at an initial position;
wherein progressive actuation of the vehicle accelerator pedal causes an increasing number of the plurality of light elements to energize in the sequential configuration.

2. The variable acceleration light assembly of claim 1, wherein every light element of the plurality of light elements is energized when the vehicle accelerator pedal is maximally depressed.

3. The variable acceleration light assembly of claim 1, wherein the sensor is an infrared sensor.

4. The variable acceleration light assembly of claim 1, wherein the sensor is a Hall-Effect sensor.

5. The variable acceleration light assembly of claim 1, wherein the sensor is a potentiostat.

6. The variable acceleration light assembly of claim 1, further comprising a power source.

7. The variable acceleration light assembly of claim 6, wherein the power source is a battery of a vehicle.

8. The variable acceleration light assembly of claim 6, wherein the power source is a battery independent of a vehicle.

9. The variable acceleration light assembly of claim 1, wherein the light bar is disposed horizontally to a rear surface of a vehicle.

10. The variable acceleration light assembly of claim 1, wherein the light bar is disposed vertically to a rear surface of a vehicle.

11. The variable acceleration light assembly of claim 1, wherein the light bar is arranged in a single row.

* * * * *